UNITED STATES PATENT OFFICE.

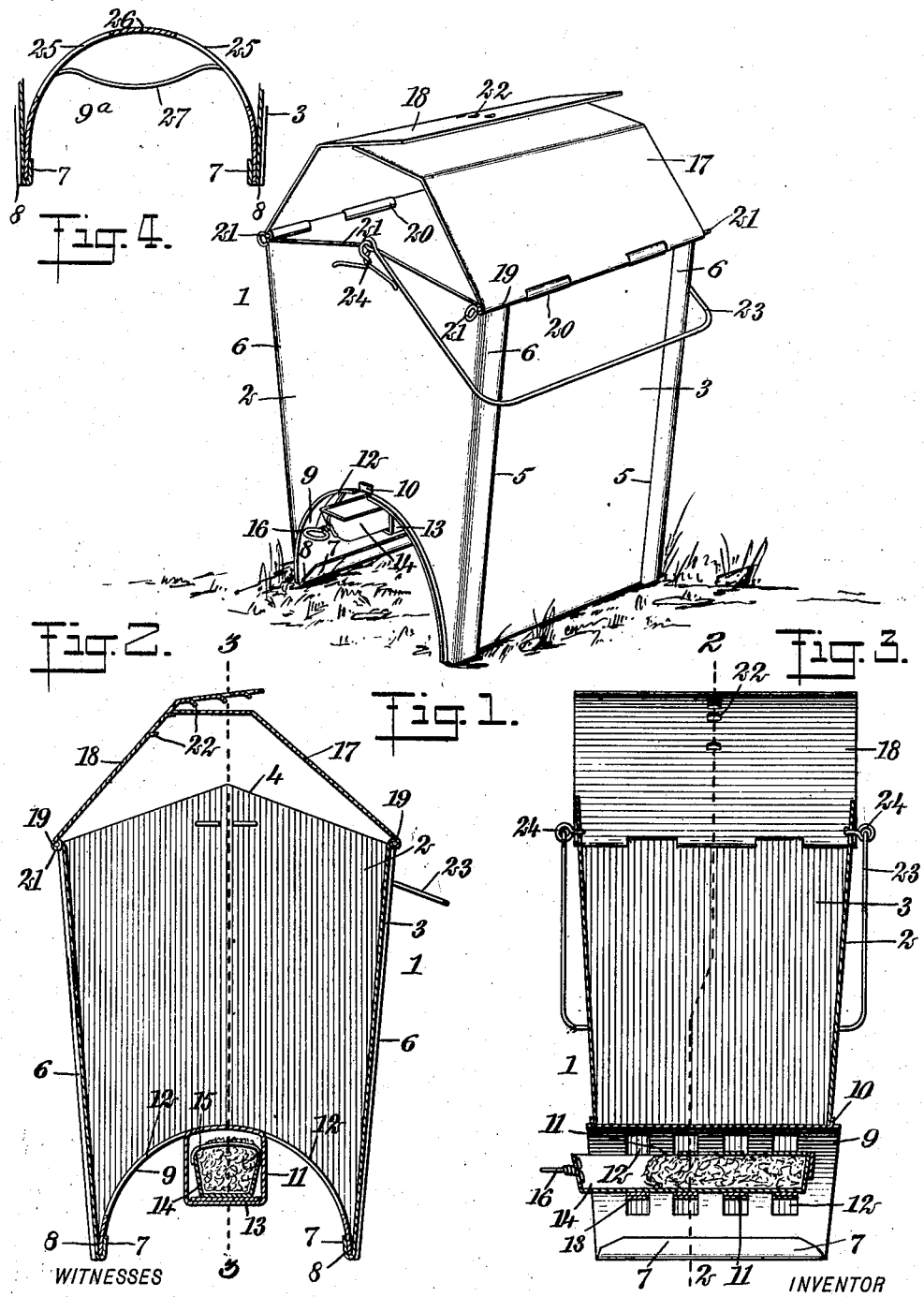

FRANK BUEHRING, OF GRAND JUNCTION, COLORADO.

HEATER.

No. 924,315.     Specification of Letters Patent.     Patented June 8, 1909.

Application filed July 30, 1908. Serial No. 446,125.

*To all whom it may concern:*

Be it known that I, FRANK BUEHRING, a citizen of the United States, and a resident of Grand Junction, in the county of Mesa and State of Colorado, have invented a new and Improved Heater, of which the following is a full, clear, and exact description.

This invention relates to heaters, and more particularly such as are adapted to be used for heating the air around fruit trees or the like, and which include casings for receiving fuel, adjustable covers whereby the air draft can be regulated within the casings, and igniting means removably carried under the casings so that the fuel can be easily and quickly lighted.

The object of the invention is to provide a device of the class described, simple and efficient in construction and inexpensive to manufacture, which can be easily carried about from place to place for heating the air around fruit trees or the like, thus obviating the danger of the latter being injured by frost; or can be used for creating a "smudge" as a protection against the rays of the sun.

Reference is to be had to the accompanying drawings forming a part of this specification, in which similar characters of reference indicate corresponding parts in all the views.

Figure 1 is a perspective view of an embodiment of my invention; Fig. 2 is a section on the line 2—2 of Fig. 3; Fig. 3 is a transverse section on the line 3—3 of Fig. 2; and Fig. 4 is a cross section of the bottom of the device, showing the same in a modified form.

Before proceeding to a more detailed description of my invention, it should be understood that in the raising of fruit or the like, it is often necessary to use heating means for protecting the blossoms or young fruit against frost. For this purpose, I provide a heater which is so constructed that it affords a great deal of heat, and which is adjustable to regulate the heat escaping therefrom.

In the specific form shown in the drawings, I provide a heater constructed of any suitable material, such as sheet metal or the like, and including a casing 1 having arched ends 2 and sides 3. The ends 2 are preferably tapered toward their arched portions. Their upper edges 4 are upwardly disposed intermediate the side edges 5. The latter are bent upon themselves so that they form flanges 6 to receive the edges of the sides 3. The latter are also tapered, their lower ends 7 being bent back so that recesses 8 are provided. Having its ends located in the recesses 8 is an arched bottom 9 which has portions 10 cut away and upwardly bent against the ends 2 so that they constitute keepers to hold the bottom in place. The bottom further has a plurality of cut-away portions 11, which leave slots 12 for a purpose to be hereinafter described, while they themselves are downwardly and laterally disposed so as to constitute a carrier 13. Adapted to be slidably and removably arranged in the carrier 13 is an igniter 14 preferably formed from a piece of sheet metal bent upon itself to constitute a trough, and having extensions 15 on one side which are bent over the open part of the trough so as to hold the material used in igniting the fuel in place, and especially, should oil be used, in preventing its too rapid evaporation. A manual grip 16 is located at one end of the igniter.

I further provide a cover for the heater, which consists of two leaves 17 and 18 respectively, which are adapted to lap over one another and are suitably bent so that in the closed position, the under leaf will fit tightly against the upper edges of the ends 2, while the other leaf of the cover will fit closely upon the under one. Both leaves of the cover have their outer ends bent upon themselves to form sleeves 19, which, in turn, register with sleeves 20 similarly formed at the upper edges of the sides 3. Removable hinge pins 21 extend through the openings of the sleeves 19 and 20 and secure the two leaves of the cover to the sides. The leaf 18 of the cover has a plurality of cut-away portions which form inwardly disposed tongues 22.

As shown most clearly in Fig. 2, the inner edge of the leaf 17 of the cover can be adjusted so that it will engage any desired one of the tongues 22, so that the draft within the casing can be regulated. Further, none of the heat which leaves the device will go straight up in the air, as the cover tends to distribute it horizontally and cause it to escape from the heater at the ends.

A handle 23 is movably secured to brackets 24 at the ends of the casing. The slots 12 in the arched bottom of the device allow the fuel which is in the casing to become quickly and evenly lighted from the igniter. Also, the bottom being arched, presents a larger heating surface, and in that way, a great quantity of heat becomes distributed over the ground adjacent to the heater.

In the modified form shown in Fig. 4, the arched bottom or grate 9ª has a plurality of slots 25, on each side of the center 26 of the bottom. At both ends of the center 26 are slots which extend from one side of the bottom to the other, and which form cut-away portions 27, the latter being downwardly disposed to constitute a carrier for the igniter 14.

Having thus described my invention, I claim as new and desire to secure by Letters Patent:—

1. A heater comprising a casing adapted to receive fuel, an adjustable cover for regulating the draft within said casing, and igniting means removably carried under said casing for lighting the fuel.

2. A heater comprising a casing adapted to receive fuel, and a cover, said cover consisting of leaves adapted to be adjusted with respect to one another to vary the opening for regulating the draft within said casing and serving to direct the escaping heat horizontally.

3. A heater comprising a casing, a movable cover, said cover having two leaves, one of said leaves having tongues to hold the other of said leaves, whereby the opening between said leaves and said casing can be adjusted to regulate the draft within the casing.

4. A heater comprising a casing, an adjustable cover arranged upon said casing, whereby the heat escaping from the latter will be horizontally directed, said casing further having an arched bottom, and igniting means removably carried adjacent to said arched bottom.

5. A heater comprising a casing, an adjustable cover arranged upon said casing, whereby the heat escaping from the latter will be horizontally directed, said casing further having an arched bottom, said arched bottom having a cut-away portion forming a carrier, and an igniter removably carried at said arched bottom by said carrier and adapted to light the fuel within said casing at said cut-away portion.

6. A heater comprising a tapered casing, an adjustable cover arranged upon said casing, whereby the heat escaping from the latter will be horizontally directed, said casing further having an arched bottom, said arched bottom having cut-away portions whereby slots are left in said bottom, several of said cut-away portions being downwardly disposed to constitute a carrier, and an igniter removably and slidably located on said carrier and adapted to light the fuel within said casing at said slots.

7. A heater adapted to contain fuel, comprising a tapered casing, a cover arranged on said casing and comprising two leaves, one of said leaves having a plurality of cut-away portions forming downwardly disposed tongues, said tongues being adapted to be engaged by the edge of said other leaf to hold said leaves raised above said casing, whereby the draft within said casing can be regulated, said casing further having an arched bottom, said arched bottom having cut-away portions leaving slots, several of said cut-away portions being downwardly disposed to constitute a carrier, an igniter removably and slidably arranged on said carrier, means for holding the material in said igniter in place, and a handle pivotally secured to said casing whereby the heater may be carried about.

In testimony whereof I have signed my name to this specification in the presence of two subscribing witnesses.

FRANK BUEHRING.

Witnesses:
ADOLPH G. FUCHS,
L. WICKERSHAM.